(12) United States Patent
Chun et al.

(10) Patent No.: US 8,223,706 B2
(45) Date of Patent: Jul. 17, 2012

(54) METHOD FOR TRANSMITTING/RECEIVING DATA IN A MOBILE COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 12/450,149

(22) PCT Filed: Mar. 14, 2008

(86) PCT No.: PCT/KR2008/001470
§ 371 (c)(1),
(2), (4) Date: Sep. 14, 2009

(87) PCT Pub. No.: WO2008/111822
PCT Pub. Date: Sep. 18, 2008

(65) Prior Publication Data
US 2010/0035621 A1    Feb. 11, 2010

Related U.S. Application Data

(60) Provisional application No. 60/895,117, filed on Mar. 15, 2007.

(30) Foreign Application Priority Data

Mar. 14, 2008   (KR) ..................... 10-2008-0023920

(51) Int. Cl.
*H04W 4/00* (2009.01)
(52) U.S. Cl. ................ 370/329; 370/330; 370/395.4; 370/349; 455/450; 455/452.1; 455/515

(58) Field of Classification Search .......... 370/328–330, 370/395.4–395.43, 442, 336, 345, 349, 474; 455/450–452.2, 515
See application file for complete search history.

(56) References Cited

U.S. PATENT DOCUMENTS 6,032,197 A    2/2000    Birdwell et al.
(Continued)

FOREIGN PATENT DOCUMENTS
KR   10-2007-0016208    2/2007
(Continued)

OTHER PUBLICATIONS

Freescale Semiconductor et al.: "DL Scheduling", 3GPP TSG-RAN WG2, R2-070968, Feb. 2007.

(Continued)

*Primary Examiner* — Marcos Torres
(74) *Attorney, Agent, or Firm* — McKenna Long & Aldridge LLP

(57) ABSTRACT

A method for transmitting/receiving data in a mobile communication system and a method for efficiently using more radio resource if allocation of the more radio resource is required in addition to a predetermined radio resource are disclosed. An example of a method for receiving data in a mobile communication system includes receiving first control information using a first identifier, receiving second control information transmitted in the same time period with the first control information using a second identifier, and receiving the data via at least one of a first radio resource indicated by the first control information and a second radio resource indicated by the second control information.

9 Claims, 20 Drawing Sheets

U.S. PATENT DOCUMENTS

| | | | |
|---|---|---|---|
| 7,656,902 B2 * | 2/2010 | Yi et al. | 370/474 |
| 2003/0157921 A1 | 8/2003 | Kekki et al. | |
| 2004/0125817 A1 * | 7/2004 | Miyazaki et al. | 370/411 |
| 2006/0221993 A1 | 10/2006 | Liao et al. | |
| 2006/0274694 A1 | 12/2006 | Rajkumar et al. | |
| 2009/0274107 A1 | 11/2009 | Park et al. | |

FOREIGN PATENT DOCUMENTS

| | | |
|---|---|---|
| WO | WO 2005/074308 | 8/2005 |
| WO | WO 2006/075042 | 7/2006 |

OTHER PUBLICATIONS

Ericsson: "Semi Persistent Scheduling", 3GPP TSG-RAN WG2, R2-062859, Oct. 2006, XP002496512.

Rapporteur (Motolola): "Report of E-Mail Discussion: DL Scheduling", 3GPP TSG-RAN WG1, R1-063684, Dec. 2006.

NEC: "Persistent Scheduling and Dynamic Allocation", 3GPP TSG-RAN WG2, R2-062788, Oct. 2006, XP050132317.

* cited by examiner

METHOD FOR TRANSMITTING/RECEIVING DATA IN A MOBILE COMMUNICATION SYSTEM

This application is a 371 national stage entry of International Application No. PCT/KR2008/001470, filed Mar. 14, 2008, and claims priority to U.S. Provisional Patent Application No. 60/895,117, filed Mar. 15, 2007 and Korean Patent Application No. 10-2008-0023920, filed Mar. 14, 2008, the contents of each of the above-identified applications is incorporated by reference herein in their entireties.

TECHNICAL FIELD

The present invention relates to a mobile communication system, and more particularly to a method for transmitting/receiving data in a mobile communication system.

BACKGROUND ART

FIG. 1 illustrates a network structure of an evolved universal mobile telecommunications system (E-UMTS) which is a mobile communication system.

The E-UMTS is a system evolved from the existing UMTS and a basic standardization thereof is currently being performed in the 3GPP. The E-UMTS may be called a long term evolution (LTE) system.

The E-UMTS network may be largely classified into a UMTS terrestrial radio access network (E-UTRAN) and a core network (CN). The E-UTRAN includes a terminal (user equipment: UE), a base station (eNode-B or eNB), a serving gateway (S-GW) which is located at an end of the network and is connected to an external network, and a mobility management entity (MME) for managing mobility of the terminal. One ore more cells may exist for a single base station.

FIGS. 2 and 3 illustrate the structure of a radio interface protocol between the terminal and the base station based on the 3GPP radio access network standard.

The radio interface protocol is horizontally divided into a physical layer PHY, a data link layer and a network layer and is vertically divided into a user plane for transmitting data information and a control plane for transmitting control signaling. FIG. 2 shows layers of the radio protocol control plane and FIG. 3 shows the layers of the radio protocol user plane.

The protocol layers may be divided into a first layer (L1), a second layer (L2) and a third layer (L3) based on the three lower layers of an open system interconnection (OSI) standard model which is well-known in the art of communication systems.

The PHY layer, which is the first layer, provides an information transfer service to an upper layer by using a physical channel. The PHY layer is connected with a medium access control (MAC) layer located at a higher level through a transport channel, and data between the MAC layer and the PHY layer is transferred via the transport channel. Between different physical layers, namely, between PHY layers of a transmission side and a reception side, data is transferred via the physical channel.

The MAC layer of the second layer provides services to a radio link control (RLC) layer, which is a higher layer, via a logical channel. The RLC layer of the second layer supports the transmission of data with reliability. The function of the RLC layer may be implemented by a functional block within the MAC layer. In this case, the RLC layer may not exist.

The PDCP layer of the second layer performs a header compression function that reduces the size of an Internet protocol (IP) packet header containing unnecessary control information having a relatively large size in order to efficiently transmit the IP packets such as IPv4 or IPv6 over a radio interface having a small bandwidth.

A radio resource control (RRC) layer located at the highest portion of the third layer (L3) is only defined in the control plane and controls logical channels, transport channels and the physical channels in relation to the configuration, reconfiguration, and release of the radio bearers (RBs). Here, the RB signifies a service provided by the second layer for data transmission between the terminal and the UTRAN.

FIG. 4 illustrates an example of a method for allowing the terminal to receive data in the E-UMTS.

The base station and the terminal may mostly transmit/receive data via a downlink shared channel (DL-SCH) as a transport channel and a physical downlink shared channel (PDSCH) as a physical channel, except for a specific control signal or specific service data. At this time, data transmitted via the PDSCH is transmitted to one or more terminals, and information indicating how the terminals receive the data via the PDSCH and decode the data may be transmitted via a physical downlink control channel (PDCCH) as a physical channel.

If the control information of the plurality of terminals is transmitted together, the control information may be identified using an identifier in order to identify the control information of each of the terminals. For example, it is assumed that a specific PDCCH, in which a cyclic redundancy check (CRC) is masked with a radio network temporary identifier (RNTI) "A" and information about data which is being transmitted with transport format information "C" (e.g., a transport block size, modulation, coding information and so on) via a radio source "B" (e.g., frequency position) is included, is transmitted in a specific sub-frame. The RNTI with which the CRC is masked in the specific PDCCH may be transmitted via as described above. Or, The RNTI may be transmitted in a state of being included in the PDCCH.

In this case, one or more terminals located in a cell monitor the PDCCH using its RNTI information and receive the PDCCH if one or more terminals having the RNTI A exist at that time. At this time, the PDSCH indicated by the B and C may be received via the received PDCCH.

In the above-described process, in order to report to which terminal allocation information of the radio resource transmitted via the PDCCH corresponds, an identifier, e.g., a RNTI, is transmitted. The RNTI includes a dedicated RNTI and a common RNTI. The dedicated RNTI is used for transmission/reception of data to a specific terminal and is used when the information of the terminal is registered in the base station.

In contrast, the common RNTI is used for transmission of information which is commonly used by the plurality of terminals, such as system information, or for transmission/reception of data to/from terminals which are not allocated with dedicated RNTIs because the information of the terminals is not registered in the base station. For example, in a random access channel (RACH) process, a random access RNTI (RA-RNTI) or T-C RNTI may correspond to the common RNTI.

DISCLOSURE OF INVENTION

Accordingly, the present invention is directed to a method for transmitting/receiving data in a mobile communication system that substantially obviates one or more problems due to limitations and disadvantages of the related art.

An object of the present invention devised to solve the problem lies on a method for allocating more radio resource in addition to a predetermined radio resource in a mobile communication system and using the more radio resource.

The object of the present invention can be achieved by providing a method for receiving data in a mobile communication system, the method including: receiving first control information using a first identifier; receiving second control information transmitted in the same time period with the first control information using a second identifier; and receiving the data via at least one of a first radio resource indicated by the first control information and a second radio resource indicated by the second control information.

The first control information may include a more resource indicator related to the second radio resource.

The data may be received via at least one of the first radio resource and the second radio resource according to priorities of the first identifier and the second identifier.

Each of the first identifier and the second identifier may be one of a group specific identifier and a terminal specific identifier.

Compressed packet data may be received is received via the first radio resource and full packet data may be received via the second radio resource.

A single data block may be received via the first radio resource and the second radio resource.

In another aspect of the present invention, provided herein is a method for receiving data in a mobile communication system, the method including: receiving first control information including a more resource indicator using a first identifier; receiving the data via a first radio resource according to the first control information if the more resource indicator is negative; and receiving the data via at least one of the first radio resource and a second radio resource allocated in the same time period with the first radio resource if the more resource indicator is positive.

The method may further includes, if the more resource indicator is positive, receiving second control information using a second identifier; and acquiring information about the second radio resource via the second control information.

The data may be received via at least one of the first radio resource and the second radio resource, according to priorities of the first identifier and the second identifier.

In another aspect of the present invention, provided herein is a method for receiving data in a mobile communication system, the method including: receiving first data via a first radio resource according to predetermined first control information; checking a more resource indicator related to a second radio resource allocated in the same time period with the first radio resource via the first data; and receiving second data via the second radio resource.

The first data may include scheduling information of the second radio resource.

The first data may be compressed packet data and the second data may be full packet data.

The first data and the second data may be included in a single packet data block.

In another aspect of the present invention, provided herein is a method for transmitting data in a mobile communication system, the method including: configuring first control information including scheduling information of a first radio resource and a more resource indicator related to a second radio resource allocated in the same time period with the first radio resource, using a first identifier; and transmitting the first control information.

The method may further include, if the more resource indicator is positive, configuring second control information including scheduling information of the second radio resource using a second identifier; and transmitting the second control information in the same time period with the first control information.

ADVANTAGEOUS EFFECTS

According to the present invention, in a process of receiving radio resource allocation information by a terminal, if data requiring more radio resources than a radio resource having a predetermined size is received, it is possible to efficiently use more radio resource.

In addition, it is possible to minimize the amount of radio resources necessary for informing a terminal of more radio resource allocation information and thus allow the terminal to efficiently receive its own data.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present specification suggests a method for efficiently informing terminals of more radio resource allocation information when a data block for requiring more radio resources than a predetermined radio resource should be transmitted, in allocation of the radio resource from an base station to the terminals.

The embodiments of the present specification are applicable to a variety of mobile communication systems such as an evolved universal mobile telecommunications system (E-UMTS) evolved from a UMTS or a long term evolution (LTE) system.

A method for allowing a base station to efficiently transmit information indicating whether the terminal uses only a predetermined radio resource, a radio resource which is newly configured, or the two radio resources and information about the radio resource which is newly configured is suggested. The following embodiments are described using an example of using two radio resources, but the present invention is applicable to a case of using a plurality of radio resources.

Figure 1:
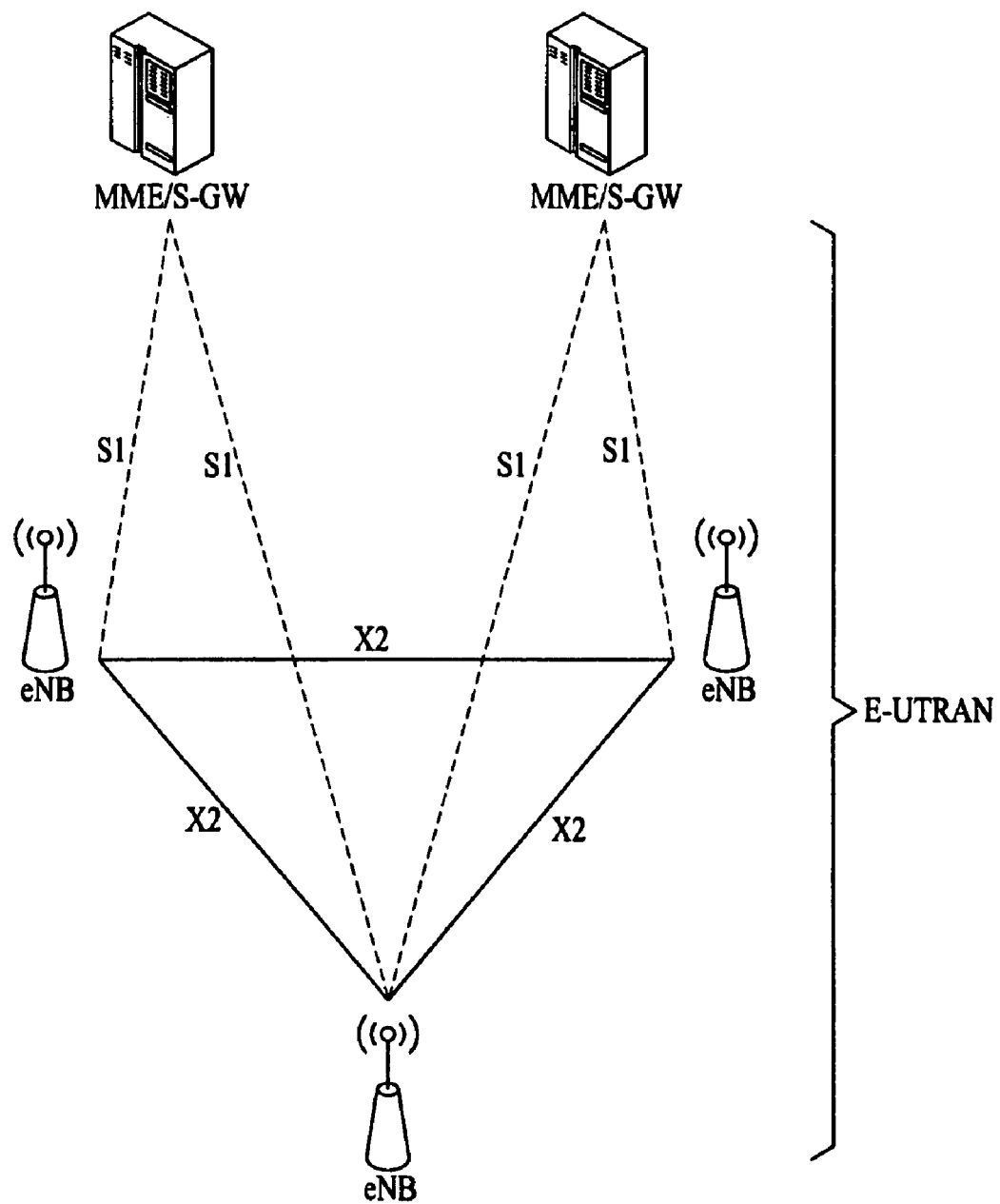
FIG. 1 illustrates a network structure of an evolved universal mobile telecommunications system (E-UMTS) which is a mobile communication system.
Figure 2:
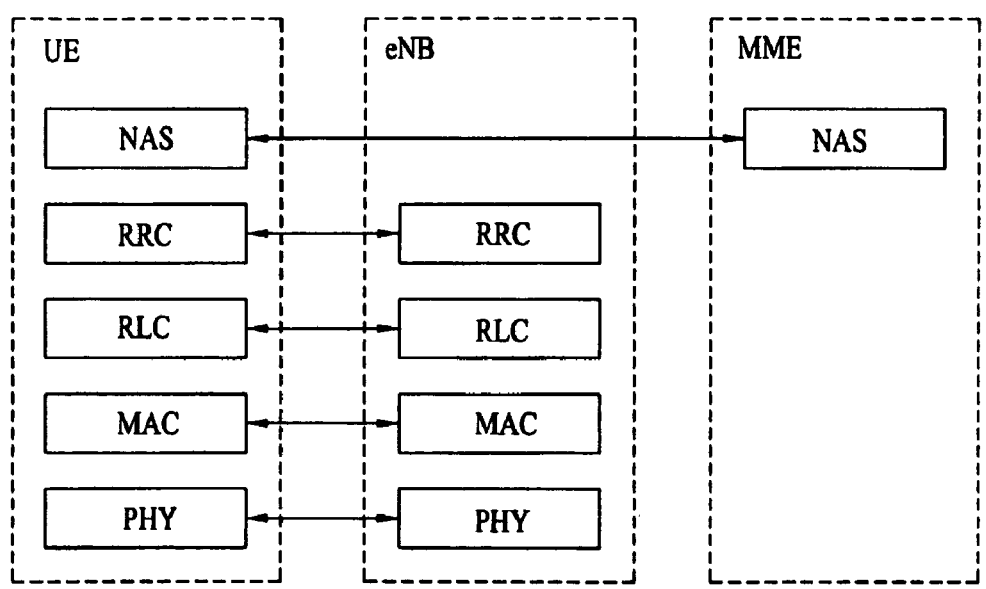
FIG. 2 illustrates the structure of a radio interface protocol of a control plane between a terminal and an base station based on the 3GPP radio access network standard.
Figure 3:
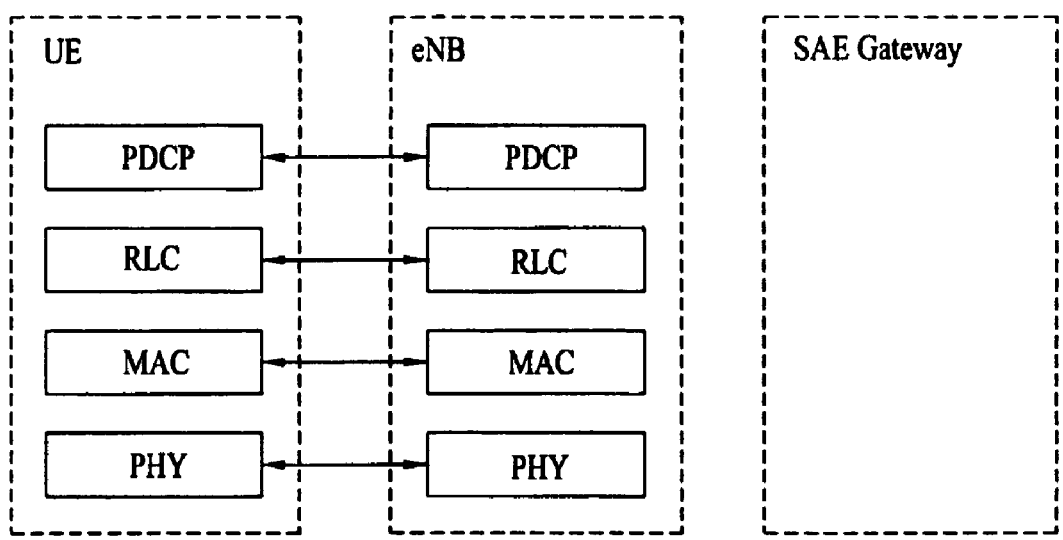
FIG. 3 is illustrates the structure of a radio interface protocol of a user plane between a terminal and an base station based on the 3GPP radio access network standard.
Figure 4:
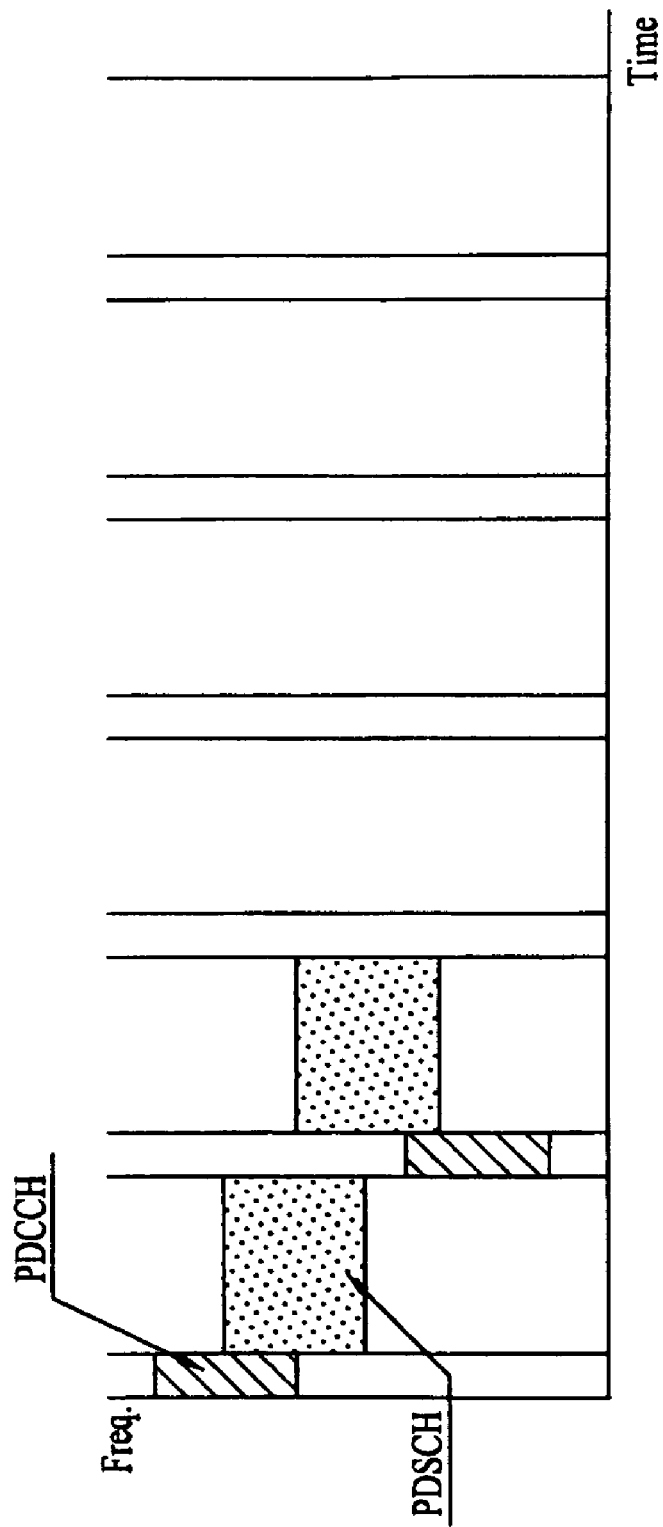
FIG. 4 illustrates an example of a method for allowing the terminal to receive data in the E-UMTS.
Figure 5:
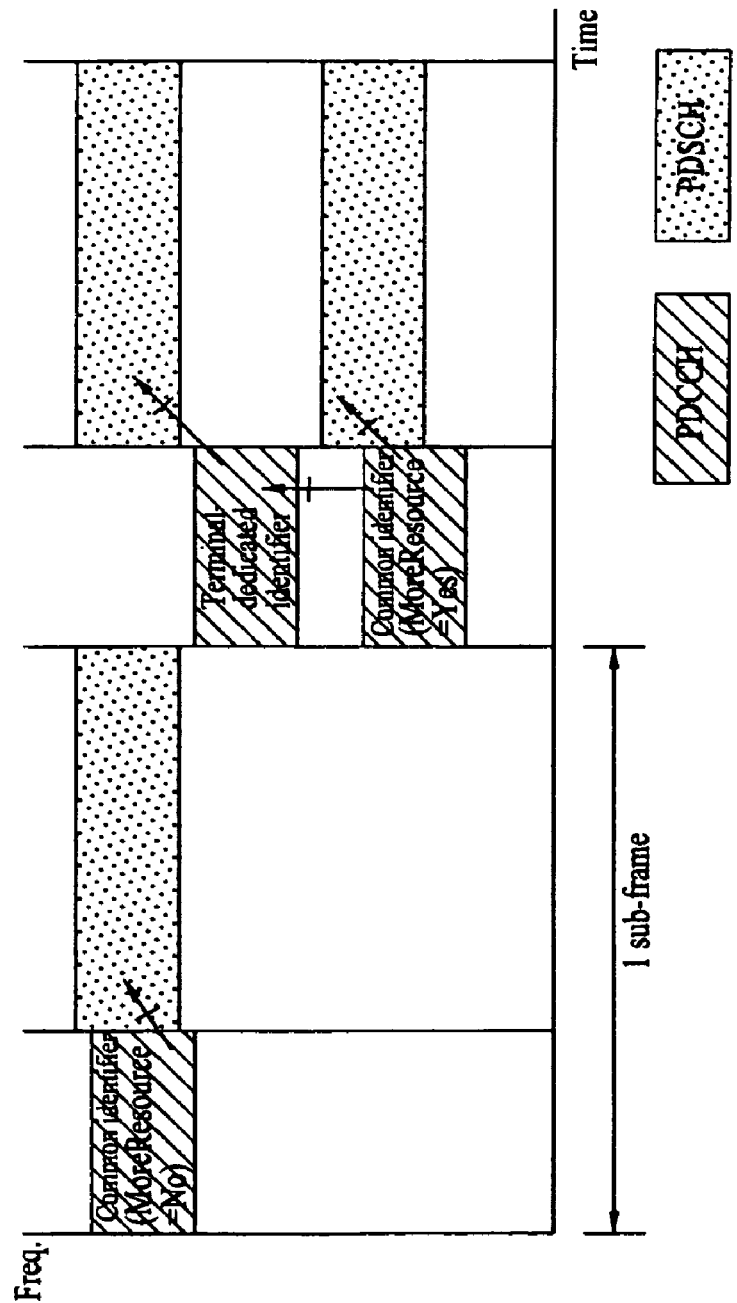
FIG. 5 illustrates a method for using more radio resource using a plurality of identifiers according to an embodiment of the present invention.

FIG. 5 illustrates a method for using more radio resource according to an embodiment of the present invention.

According to the present embodiment, a terminal can check a predetermined radio resource and receive data. At this time, if it is checked that more radio resource exists, the terminal can check the more radio resource and receive more data. At this time, if the predetermined radio resource is checked via a first identifier, the more radio resource can be checked via a second identifier.

At this time, the two radio resources may be allocated in the same time period, that is, the same sub-frame, or allocated in different time periods, that is, different sub-frames. That is, the more radio resource may be allocated after a specific time.

Referring to FIG. 5, a common identifier and a terminal-dedicated identifier may be used as the first identifier and the second identifier, respectively. The terminal is allocated with the common identifier and the terminal-dedicated identifier. First, the terminal receives a PDCCH using the common identifier. Thereafter, the terminal decodes information transmitted via the PDCCH using the common identifier and checks whether the more radio resource exists.

Since the PDCCH related to the common identifier includes a more resource indicator indicating whether the more radio resource exists, the terminal can receive the PDCCH using the common identifier and check whether the more radio resource exists. That is, the more resource indicator indicates that a specific terminal should receive the PDCCH using the terminal-dedicated identifier. In this case, terminal identifier can be included in the PDCCH related to the common identifier.

If the more resource indicator is Negative, the data can be received via the radio resource indicated by the PDCCH related to the common identifier.

If the more resource indicator is Positive, information transmitted via the PDCCH using the terminal-dedicated identifier can be decoded. As a result, if it is checked that the PDCCH is provided for the terminal, the data can be received via at least one of the radio resource indicated by the PDCCH related to the common identifier and the radio resource indicated by the PDCCH related to the terminal-dedicated identifier.

In the following description, it is assumed that a RNTI is used as an identifier for identifying to which terminal control information is provided. In addition, it is assumed that the RNTI with which a CRC is masked in the control information is transmitted. However, the methods described in the following embodiments are applicable to other cases of transmitting the identifier using other methods such as a case of transmitting the identifier in a state of being included in the control information.

Figure 6:
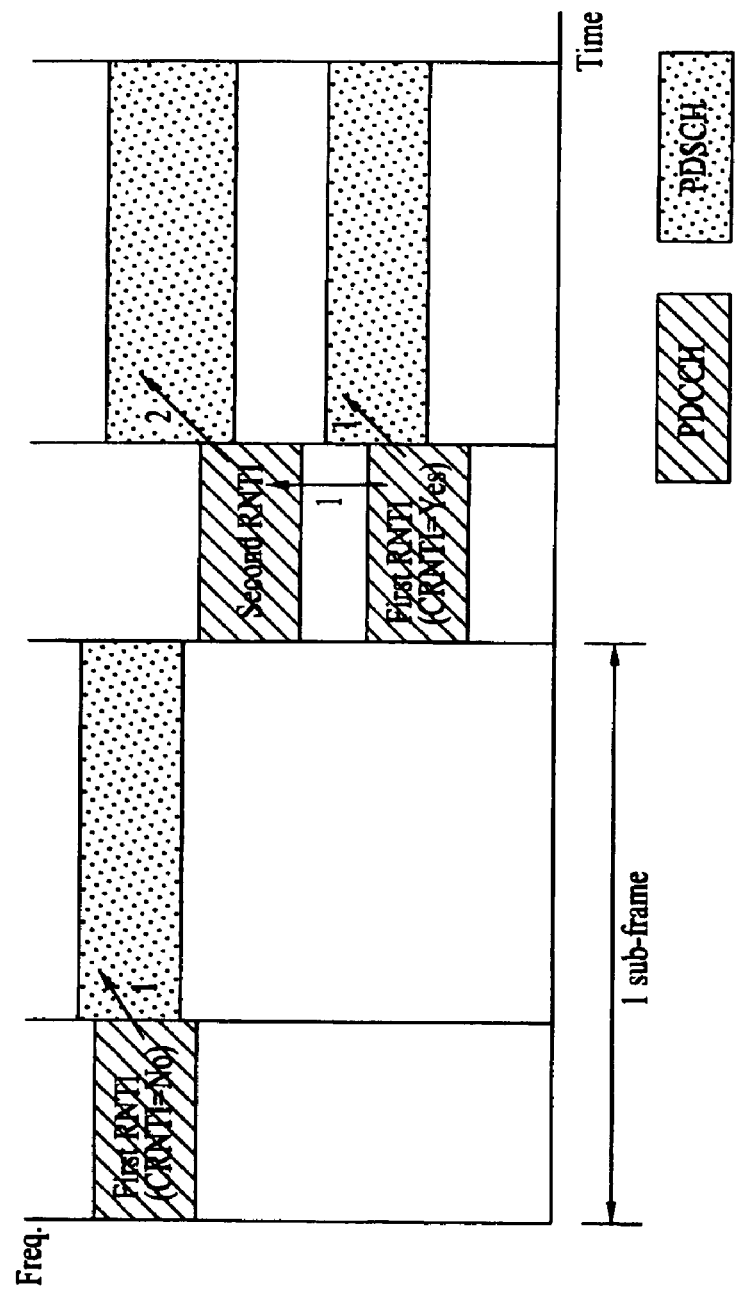
FIG. 6 illustrates a method for using more radio resource using a plurality of identifiers according to an embodiment of the present invention.
Figure 7:
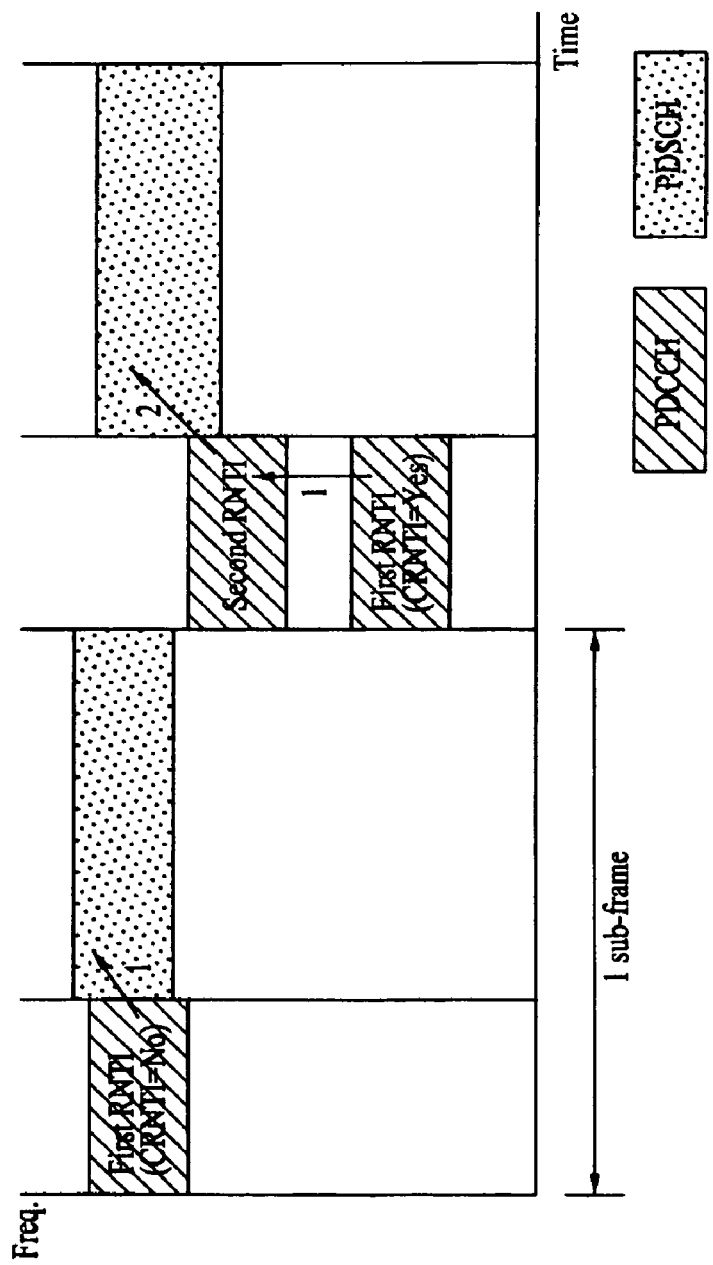
FIG. 7 illustrates a method for using more radio resource using a plurality of identifiers according to an embodiment of the present invention.

FIGS. 6 and 7 illustrate methods for using more radio resource using a plurality of identifiers according to an embodiment of the present invention.

In FIGS. 6 and 7, the terminal receives the PDCCH using a first RNTI in every sub-frame. If the PDCCH is successfully decoded using the first RNTI, the terminal can check whether a second RNTI is additionally configured. If the second RNTI is not configured, only one indicated by the first RNTI can be received. If the second RNTI is configured, the PDCCH tries to be additionally decoded using the second RNTI. Thus, it can be checked whether the more radio resource allocated to the terminal exists.

The present embodiment shows the case where the result of decoding the PDCCH using the second RNTI by the terminal is Positive, which indicates that the more radio resource allocated to the terminal exists. In this case, the terminal can receive the radio resource according to the information.

In particular, FIG. 6 shows an example of receiving the data using both the radio resource allocated by the first RNTI and the radio resource allocated by the second RNTI and FIG. 7 shows an example of receiving the data using only the radio resource allocated by the second RNTI without using the radio resource allocated by the first RNTI.

Figure 8:
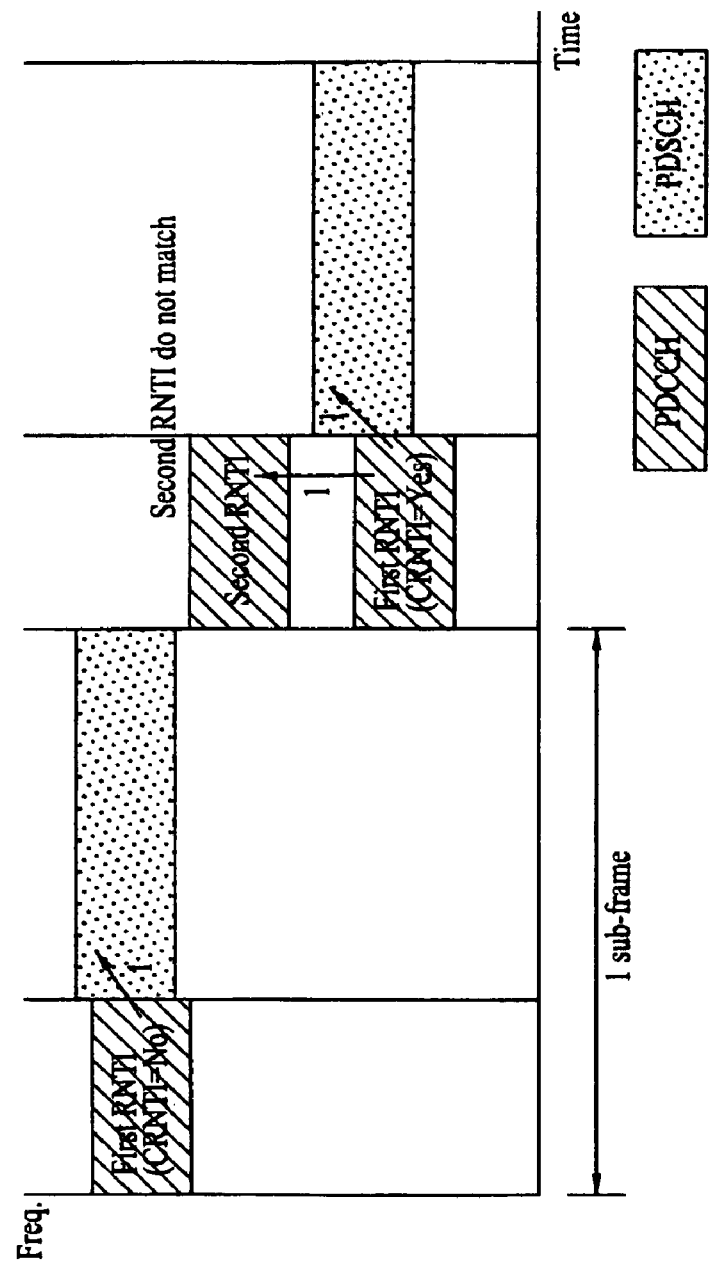
FIG. 8 illustrates a method for using more radio resource using a plurality of identifiers according to an embodiment of the present invention.
Figure 9:
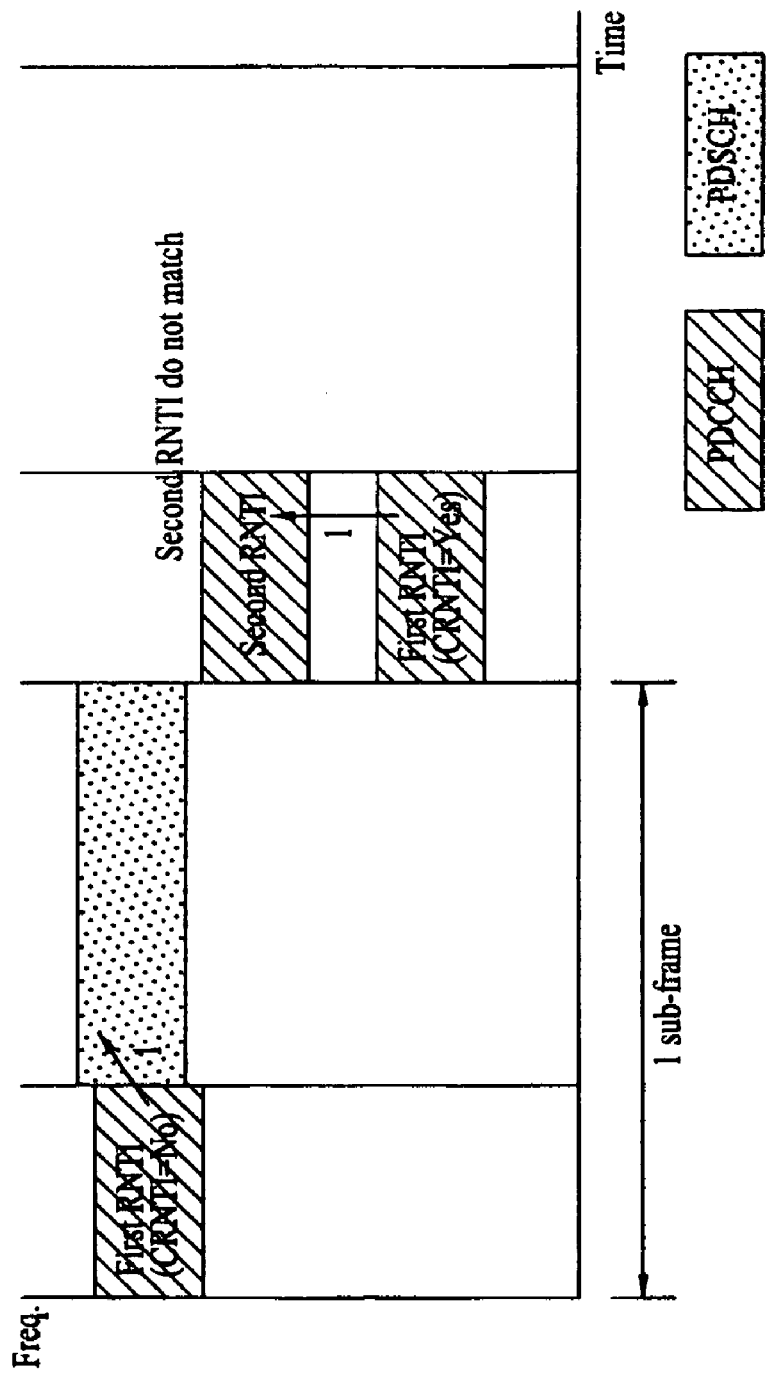
FIG. 9 illustrates a method for using more radio resource using a plurality of identifiers according to an embodiment of the present invention.

FIGS. 8 and 9 illustrate methods for using more radio resource using a plurality of identifiers according to an embodiment of the present invention.

In FIGS. 8 and 9, the terminal receives the PDCCH using a first RNTI in every sub-frame. If the PDCCH is decoded using the first RNTI, the terminal can check whether a second RNTI is additionally configured. If the second RNTI is not configured, only one indicated by the first RNTI can be received. If the second RNTI is configured, the PDCCH tries to be additionally decoded using the second RNTI. Thus, it can be checked whether the more radio resource allocated to the terminal exists.

The present embodiment shows the case where the result of decoding the PDCCH using the second RNTI by the terminal is Negative, which indicates that the more radio resource allocated to the terminal does not exist. In this case, the terminal may receive the data using only the radio resource allocated by the first RNTI as shown in FIG. 8 or may not receive the data using both the radio resource allocated by the first RNTI and the radio resource allocated by the second RNTI as shown in FIG. 9.

Figure 10:
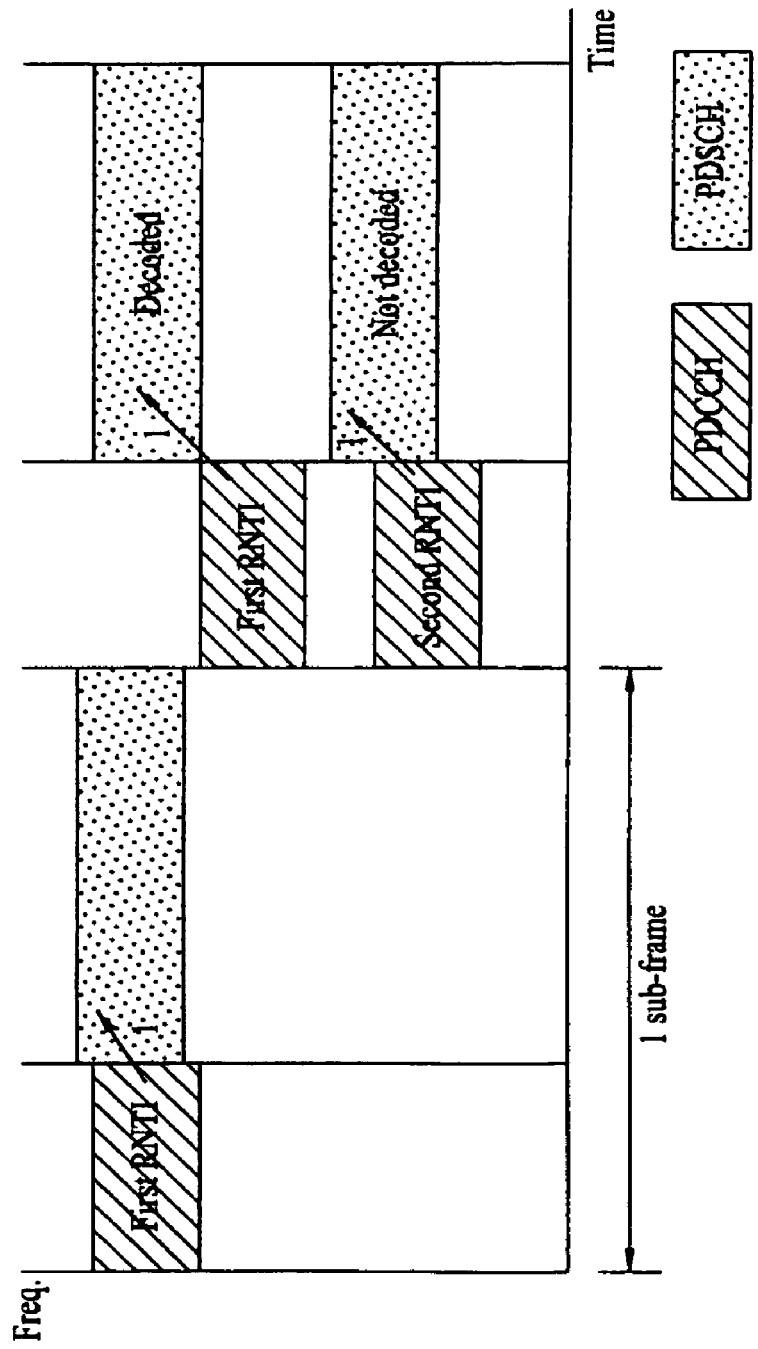
FIG. 10 illustrates a method for using more radio resource using a plurality of identifiers according to an embodiment of the present invention.
Figure 11:
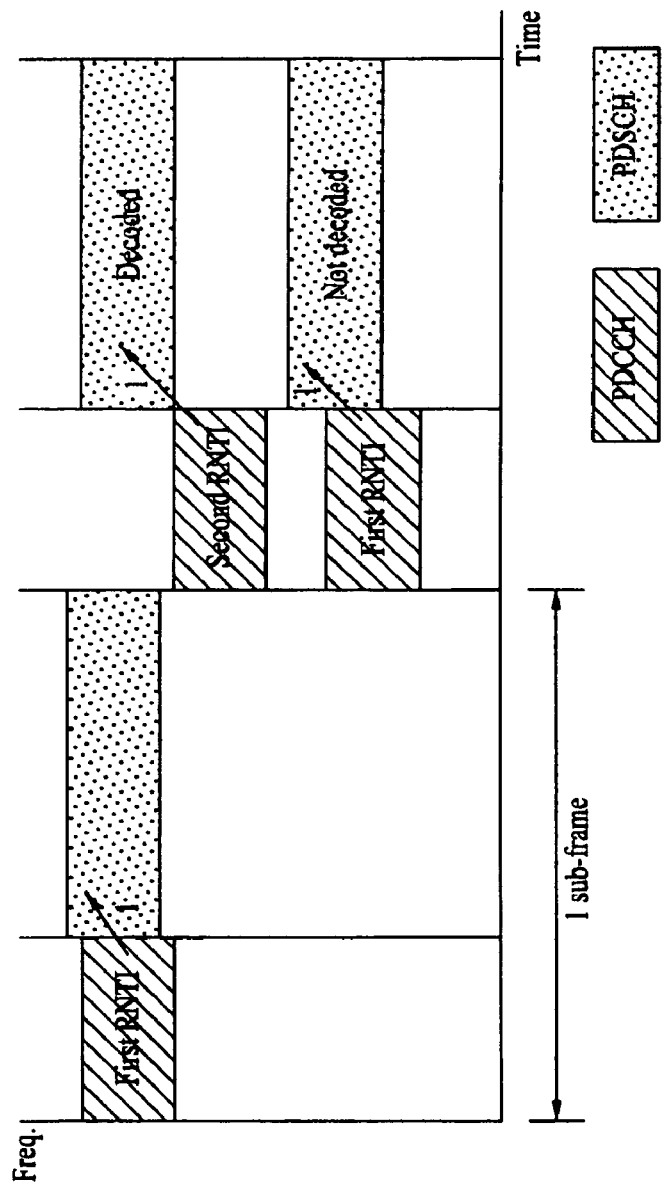
FIG. 11 illustrates a method for using more radio resource using a plurality of identifiers according to an embodiment of the present invention.

FIGS. 10 and 11 illustrate methods for using more radio resource using a plurality of identifiers according to an embodiment of the present invention.

In the present embodiment, a method for allowing the terminal to always simultaneously receive a plurality of identifiers by different methods is provided. For example, the terminal may try to always decode the PDCCH using the two RNTIs if the first RNTI and the second RNTI are allocated.

In particular, FIGS. 10 and 11 show an example of receiving the data via only one of the two RNTIs although the first RNTI and the second RNTI are simultaneously received. It may be determined via which of the two RNTIs the data is received, by various methods. For example, one of the first RNTI and the second RNTI may be set and used case by case or the terminal may determine which of the first RNTI and the second RNTI is received or is not received according to the priorities of the RNTIs. If the result of decoding the PDCCH using the first RNTI is Negative or if the result of decoding the PDCCH using the second RNTI is Negative, it is apparent the data cannot be received via the respective radio resources.

FIG. 10 shows the case where the terminal receives the data via the radio resource indicated by the first RNTI if the PDCCH is successfully decoded using both the first RNTI and the second RNTI, and FIG. 11 shows the case where the terminal receives the data via the radio resource indicated by the second RNTI although the PDCCH is successfully decoded using both the first RNTI and the second RNTI.

Figure 12:
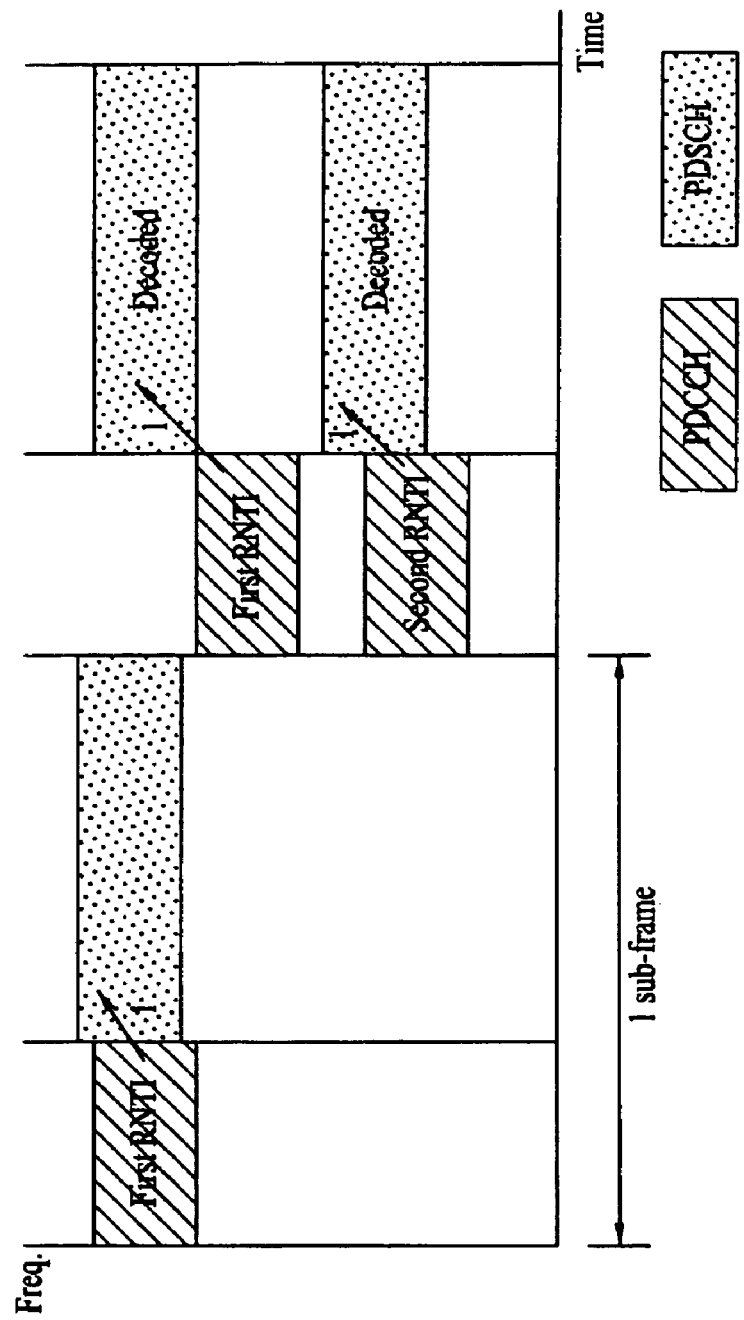
FIG. 12 illustrates a method for using more radio resource using a plurality of identifiers according to an embodiment of the present invention.

FIG. 12 illustrates a method for using more radio resource using a plurality of identifiers according to an embodiment of the present invention.

According to the present embodiment, similar to FIGS. 10 and 11, the two RNTIs, that is, the first RNTI and the second RNTI, can be simultaneously received. However, in the present embodiment, the terminal can try to always decode the PDCCH using both the two RNTIs if the first RNTI and the second RNTI are allocated.

According to the present embodiment, if the control information is received via the PDCCHs acquired using the two RNTIs, that is, the first RNTI and the second RNTI, the terminal can receive the data via the radio resources indicated by the PDCCHs.

In the embodiments of FIGS. 10 to 12, if both the second RNTI and the first RNTI are found via the PDCCHs, the terminal can transmit an error report to the base station in order to report such a situation.

Meanwhile, for example, the data may be transmitted by performing a header compression method in a PDCP layer. The header compression method uses a fact that, in Internet protocol (IP) packets belonging to the same packet stream, most portions of IP headers are not changed, and indicates a method for reducing overhead of the IP headers by storing unchanged fields in the form of a context in a compressor of a transmission side and a de-compressor of a reception side and transmitting the compressed header packets including only a changed field after the context is formed.

Figure 13:
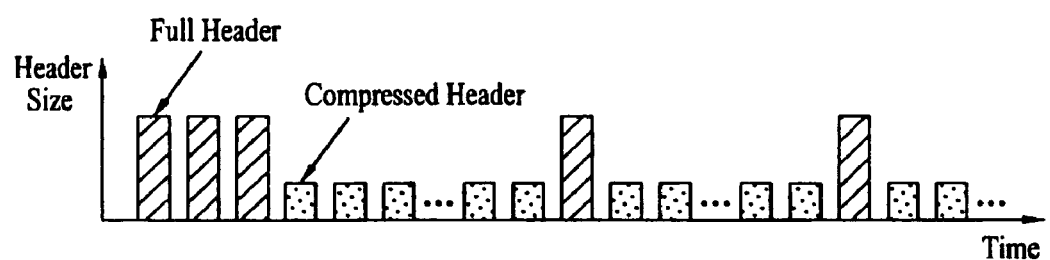
FIG. 13 illustrates an example of a method for transmitting a full header packet and a compressed header packet when a header compression method is applied in a mobile communication system.

FIG. 13 illustrates an example of a method for transmitting a full header packet and a compressed header packet when a header compression method is applied in a mobile communication system.

As shown in FIG. 13, in an initial step of the header compression, the compressor transmits the full header packet in order to configure the context for a packet stream in the de-compressor. If the context is configured in the de-compressor, the compressor transmits the compressed header packet so as to reduce the overhead.

It is determined which packet is transmitted by the full header or the compressed header with respect to a specific packet stream, by the determination of the compressor. In general, it is preferable that the full header packet is transmitted when the context is first configured with respect to any packet stream and the full header packet is transmitted if a predetermined time is elapsed while the compressed header packet is transmitted, such that the context of the de-compressor and the context of the compressor are synchronized with each other.

If a single IP packet is received from a higher layer, the compressor of the transmission side PDCP can transmit the packet to the reception side by the full header or the compressed header according to the pattern of the header. If it is determined that a new context needs to be configured or updated, the compressor transmits the packet by the full header packet and, if it is determined that the context for the header pattern of the packet is previously configured in the de-compressor, the compressor transmits the packet by the compressed header packet.

The de-compressor of the reception side PDCP should first receive the full header packet so as to configure the context with respect to any packet stream. This is because the context becomes a criterion for de-compressing the compressed headers which will be received later. If the de-compressor receives the compressed header packet in a state in which the context is not configured in the de-compressor, the de-compressor cannot decompress an original header of the packet. Thus, the received packet may be discarded.

Figure 14:
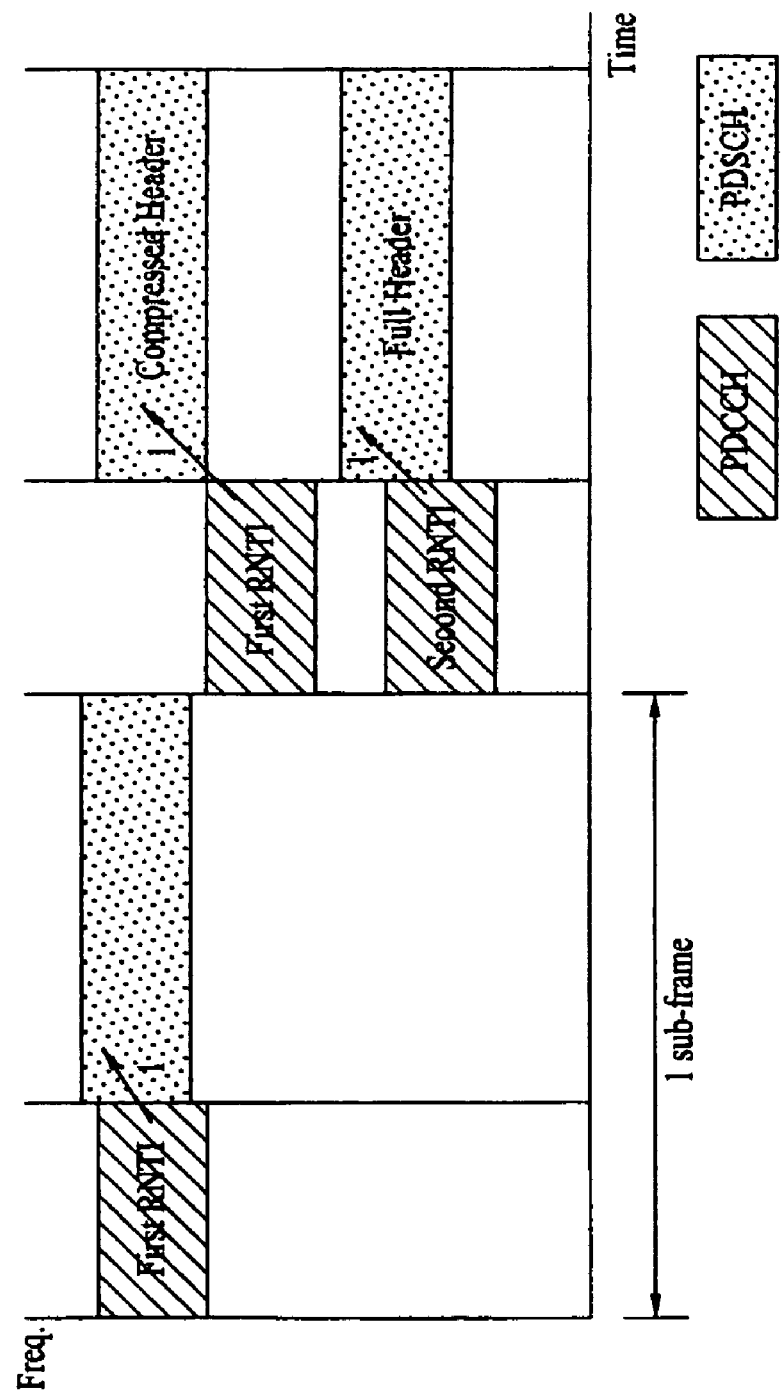
FIG. 14 illustrates a method for using more radio resource using a plurality of identifiers according to an embodiment of the present invention when the header compression method is applied.

FIG. 14 illustrates a method for using more radio resource using a plurality of identifiers according to an embodiment of the present invention when the header compression method is applied.

In FIG. 14, the compressed header packet or compressed packet data may be received via the radio resource indicated in the PDCCH decoded by the first RNTI and the full header packet or full packet data may be received via the radio resource indicated in the PDCCH decoded by the second RNTI.

Although FIG. 14 shows the example of using both the first RNTI and the second RNTI, it is apparent that the data can be received via only one of the first RNTI and the second RNTI.

For example, in FIG. 13, the radio resource related to the first RNTI may be used when the compressed header packet is transmitted and the radio resource related to the second RNTI may be used when the full header packet is transmitted. Alternatively, the radio resource related to the first RNTI may be used when the compressed header packet is transmitted, and both the radio resource related to the first RNTI and the radio resource related to the second RNTI may be used when the full header packet is transmitted.

Figure 15:
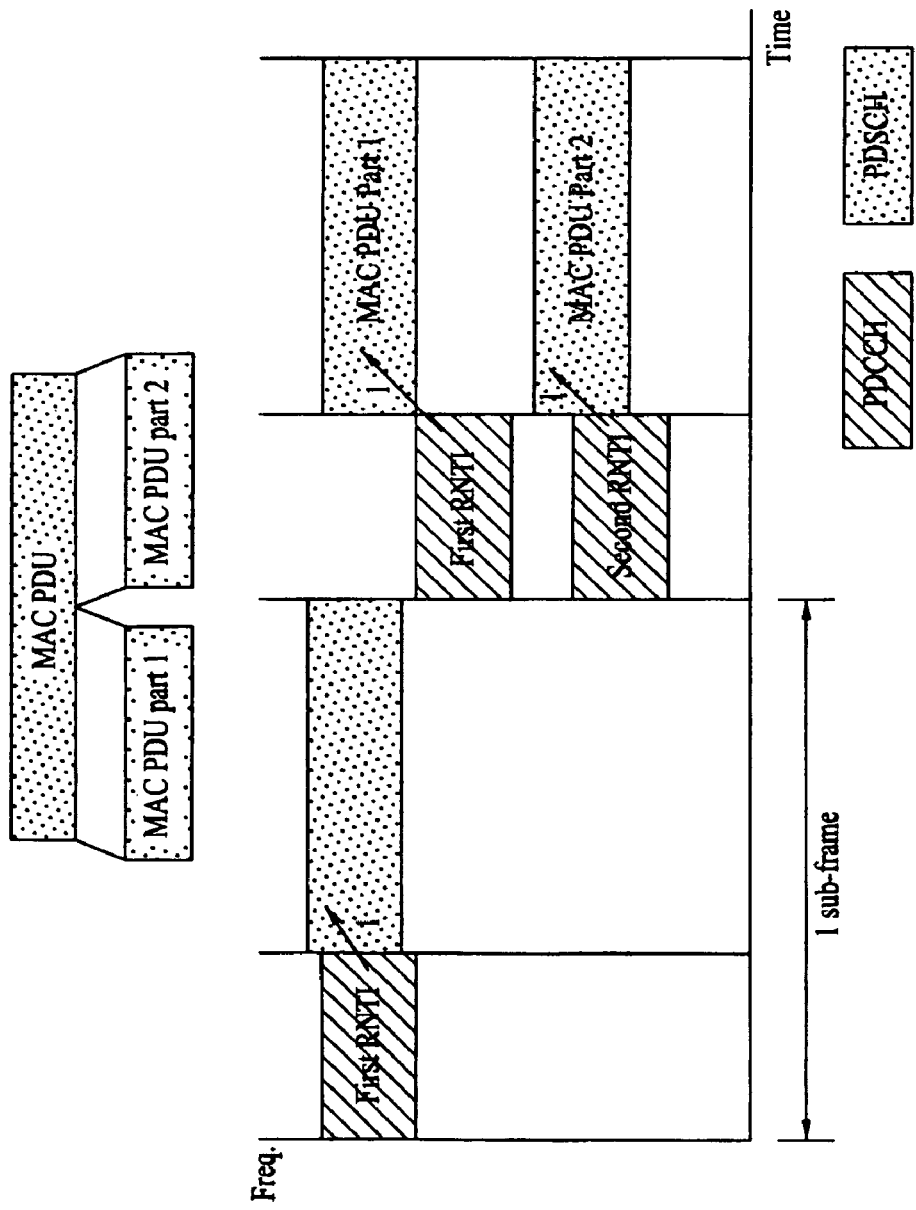
FIG. 15 illustrates a method for using more radio resource using a plurality of identifiers according to an embodiment of the present invention.

FIG. 15 illustrates a method for using more radio resource using a plurality of identifiers according to an embodiment of the present invention.

According to the present embodiment, a single data block may be divided and transmitted via the radio resources indicated by the first RNTI and the second RNTI. For example, in FIG. 15, the terminal may receive a portion of the data block (MAC PDU part 1) via the radio resource indicated in the PDCCH decoded by the first RNTI and receive the other portion of the data block (MAC PDU part 2) via the radio resource indicated in the PDCCH decoded by the second RNTI.

Figure 16:
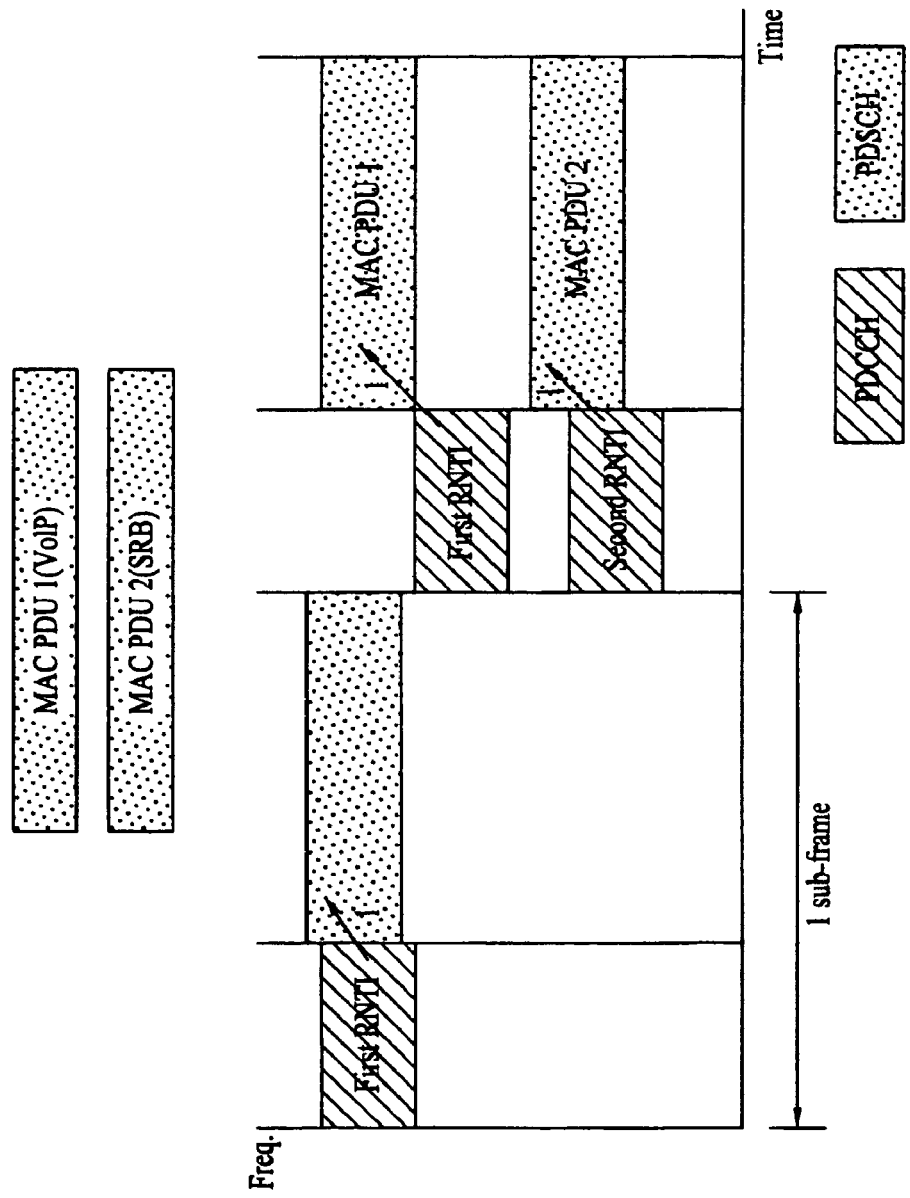
FIG. 16 illustrates a method for using more radio resource using a plurality of identifiers according to an embodiment of the present invention.

FIG. 16 illustrates a method for using more radio resource using a plurality of identifiers according to an embodiment of the present invention.

According to the present embodiment, different types of data blocks may be transmitted via the radio resources indicated by the first RNTI and the second RNTI. For example, FIG. 16 shows the case where the base station should transmit voice over Internet Protocol (VoIP) data and SRB data to the terminal. In this case, the VoIP data may be transmitted via the radio resource related to the first RNTI and the SRB data may be transmitted via the second RNTI.

The terminal may receive the respective VoIP data and the SRB data via the radio resources indicated by the RNTIs together. At this time, the base station may inform the terminal of which logical channel, which RLC or which type of data is transmitted by the RNTIs to the terminal in advance or may set which logical channel, which RLC or which type of data is transmitted by the RNTIs on the system in advance.

Figure 17:
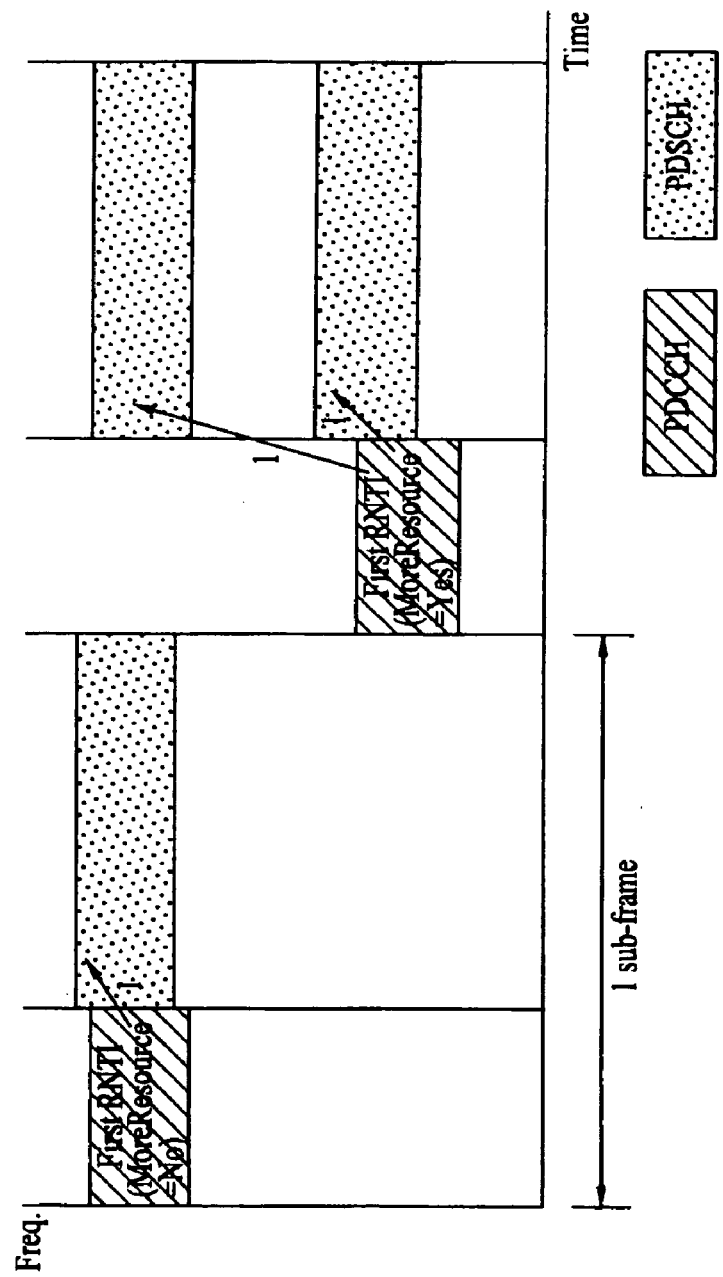
FIG. 17 illustrates a method for using more radio resource according to an embodiment of the present invention.

FIG. 17 illustrates a method for using more radio resource according to an embodiment of the present invention.

The present embodiment shows the case where a more resource indicator is transmitted together with the first RNTI. FIG. 17 shows the case where information about the more radio resource is directly informed via the PDCCH transmitted using the first RNTI. That is, according to the present embodiment, the terminal can acquire information about the more radio resource via the PDCCH related to the first RNTI without decoding using more identifier or receiving the PDCCH.

In this case, the more resource indicator indicating that the more radio resource allocation information exists is transmitted together via the PDCCH via which the first RNTI is transmitted. Accordingly, if the allocation of the more radio resource is indicated on the basis of the more resource indicator, the terminal can receive the more radio resource.

Figure 18:
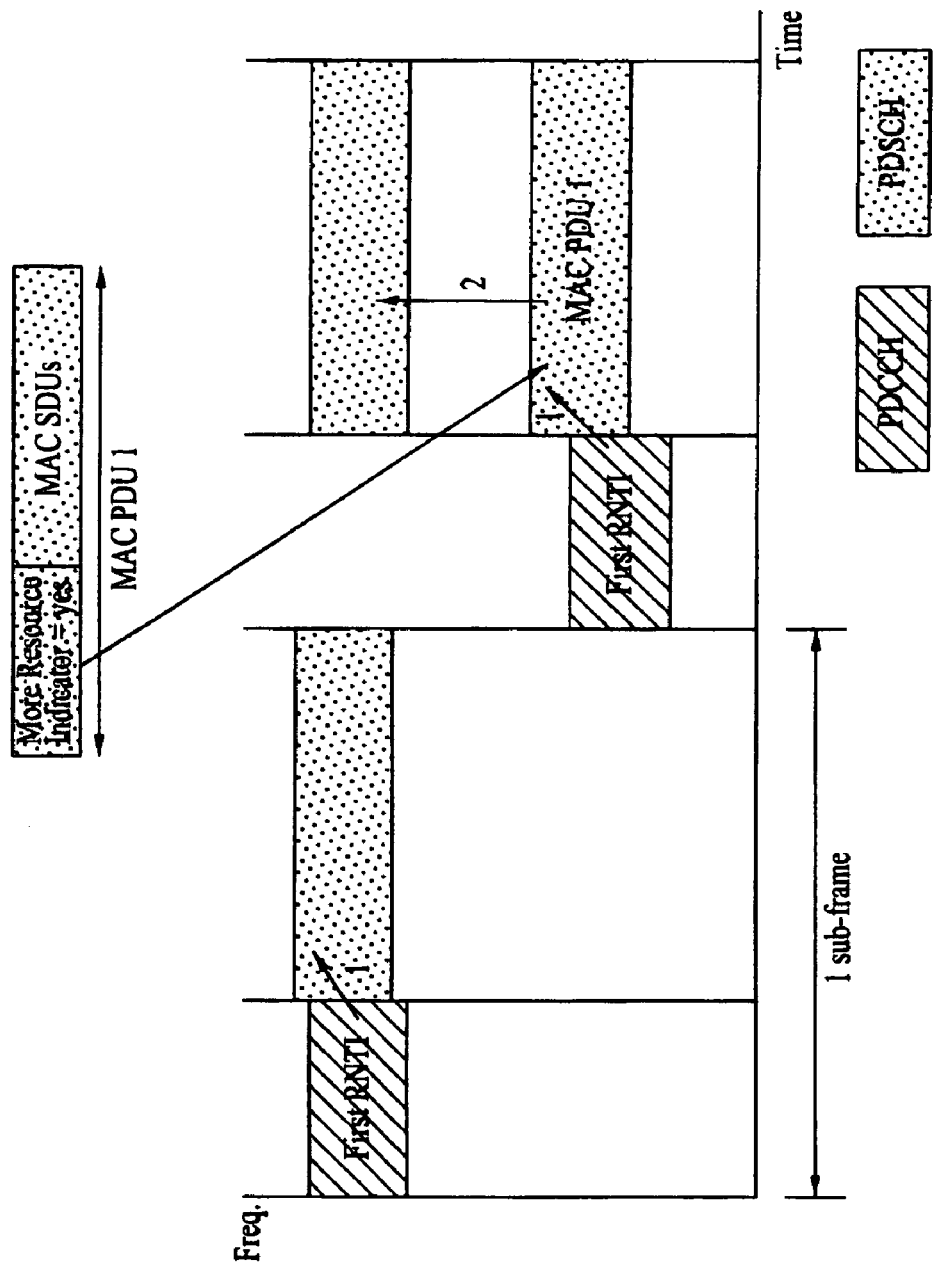
FIG. 18 illustrates a method for using more radio resource according to an embodiment of the present invention.

FIG. 18 illustrates a method for using more radio resource according to an embodiment of the present invention.

The present embodiment shows the case where the more resource indicator is transmitted together with the data received via the radio resource indicated in the first RNTI. If more radio resource is allocated because the data which will be transmitted from the base station to the terminal requires more radio resources than the radio resource allocated in relation to the first RNTI, in order to inform the terminal of the allocation of the more radio resource, the base station may include the more resource indicator and the more radio resource allocation information in an upper data block in addition to information of the radio resource allocated by the first RNTI, and may transmit the upper data block. The upper data block is transmitted via the radio resource indicated in the PDCCH decoded by the first RNTI.

For example, in FIG. 18, the terminal receives the radio resource as indicated by the first RNTI, decodes MAC PDU 1, analyzes the MAC PDU 1, and checks whether the more radio resource is indicated to the corresponding terminal using information such as the more resource indicator. If it is checked that the radio resource is allocated as the result of checking the more resource indicator, the terminal may receive the more radio resource according to the more radio resource allocation information included in the MAC PDU 1.

Meanwhile, in a voice call, a user does not always talk. That is, a voice call pattern is divided into a period in which the user actually talks, that is, a talk-spurt period, and a period in which the user does not talk, that is, a silent period. In the talk-spurt period of the voice call, a voice codec generates one voice packet at an interval of 20 ms. At this time, the sizes of the voice packets generated at the interval 20 ms are mostly equal and thus the sizes or the positions of the radio resources necessary therefore are substantially equal.

Examples of a radio resource allocation method using such a characteristic include a group scheduling method. In the group scheduling method, a method for allocating a group identifier G-RNTI to several terminals and informing the terminal of which of the terminals belonging to the group the data is additionally transmitted via the PDCCH, via which the G-RNTI is transmitted, is used.

When the radio resource is allocated to the terminal belonging to the group via the G-RNTI in a process of establishing a call, the base station informs the terminal of configuration information of the radio resource, which should be used by the terminal, in advance. If this method is used, the terminal belonging to the group tries to receive the PDCCH at a specific time interval and additionally checks contents transmitted via the PDCCH if it is checked that the G-RNTI of the group to which the terminal itself belongs is transmitted via the PDCCH.

At this time, in order to inform the terminal of to which of the terminals belonging to the group the data is transmitted, bitmap information may be additionally included when the G-RNTI is transmitted via the PDCCH. The length of the bitmap corresponds to the number of terminals belonging to the group.

In this process, any terminal belonging to the group is allocated with a first position of the bitmap and another bitmap is allocated with another position of the bitmap. Accordingly, the terminal belonging to the group additionally checks the bitmap information in the received PDCCH and determines whether the radio resource is allocated to the terminal itself, by determining whether a bit value corresponding to the terminal itself is activated.

Then, the terminal checks whether the radio resource allocated to the group is used for transmitting the data corresponding to the terminal itself and receives or transmits the data using the radio resource information, which is specified to the group in advance, if it is checked that the radio resource is used for transmitting the data corresponding to the terminal itself.

If the above-described embodiments are applied to the group scheduling method, the G-RNTI may be applied as the predetermined identifier or the first RNTI and the C-RNTI may be applied as the more identifier or the second RNTI.

That is, if the data which will be transmitted from the base station to a specific terminal requires more radio resources than the radio resource which is configured in relation to the G-RNTI and thereby the more radio resource is allocated, in order to inform the terminal of the allocation of the more radio resource, an indicator may be transmitted to the terminal in addition to the G-RNTI via the PDCCH. And the indicator may indicate that the more radio resource should be received in addition to the radio resource allocated by the G-RNTI.

The terminal recognizes the more radio resource via the indicator, checks the PDCCH via which the C-RNTI is transmitted, and receives the data via the radio resource indicated in the PDCCH.

Accordingly, if the data which will be transmitted from the base station to the specific terminal requires more radio resources than radio resource which is configured in relation to the G-RNTI, it may be efficiently informed to the terminal.

Figure 19:
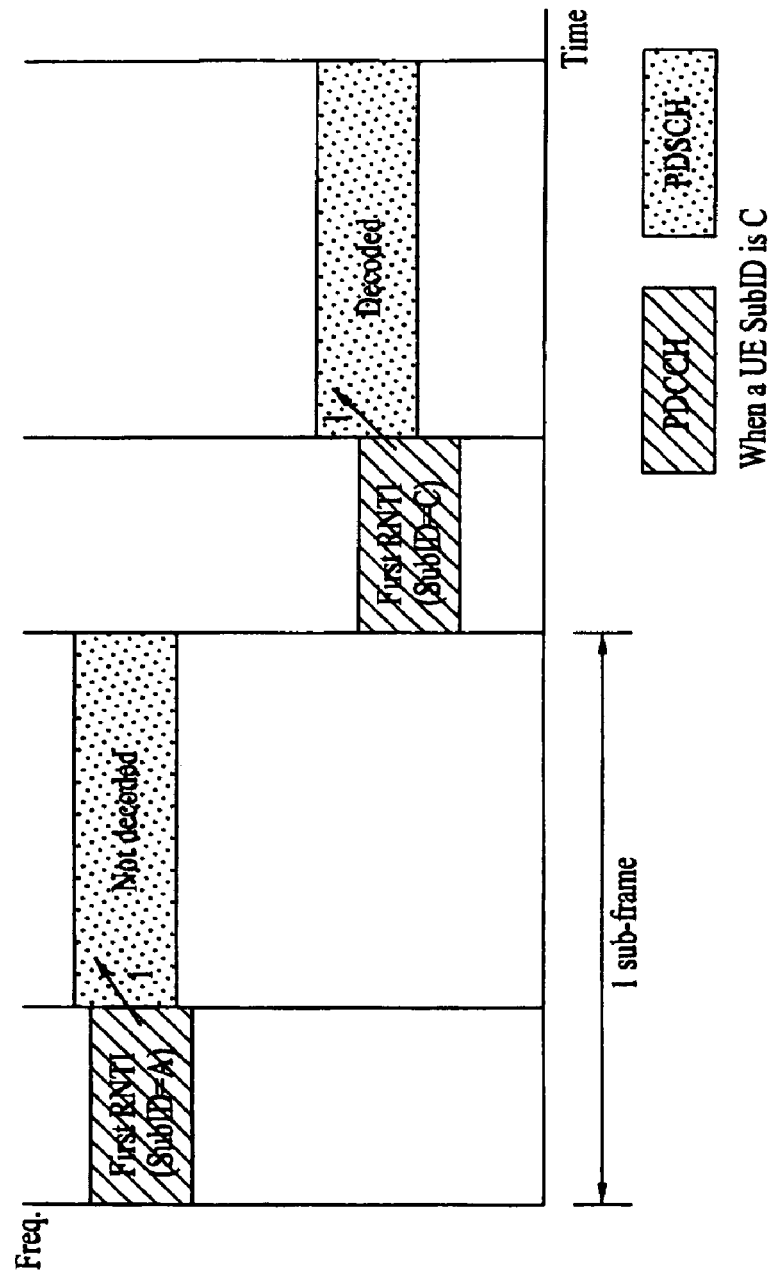
FIG. 19 illustrates a method for using a radio resource using a group identifier according to an embodiment of the present invention.

FIG. 19 illustrates a method for using a radio resource using a group identifier according to an embodiment of the present invention.

The present embodiment suggests a method for efficiently informing the terminal of allocation information of the radio resource using the group identifier G-RNTI. In more detail, the common identifier and a sub-ID thereof are allocated to the terminal.

At this time, the terminal checks whether the G-RNTI is transmitted via the PDCCH at a specific time interval. If the information transmission using the G-RNTI is checked via the PDCCH, the terminal also checks the sub-ID which is transmitted together with the G-RNTI. If the received sub-ID is equal to the sub-ID of the terminal itself, the terminal can receive the data via the radio resource indicated by the information transmitted via the PDCCH.

For example, FIG. 19 shows the operation of the terminal related to the sub-ID. In FIG. 19, if it is assumed that the sub-ID of the terminal is "C", the terminal checks the sub-ID in the PDCCH information acquired using the G-RNTI and does not receive the data via the radio resource indicated in the PDCCH information acquired using the G-RNTI if the sub-ID is set to "A". In contrast, the terminal checks the sub-ID in the PDCCH information acquired using the G-RNTI and receives the data via the radio resource indicated in the PDCCH information acquired using the G-RNTI if the sub-ID is set to "C".

Another example of a radio resource allocation method which is optimized in a service in which the characteristic of traffic is regular like the voice call includes a persistent scheduling method.

In the persistent scheduling method, for a method for processing the data transmitted/received at every transmission period, a method of statically informing the terminal of a method for transmitting/receiving the data by the base station in advance is used upon call initialization such as the configuration of a radio bearer, unlike a dynamic scheduling method for transmitting downlink scheduling information or uplink scheduling information.

Accordingly, the terminal can transmit or receive the data using predetermined information without the downlink scheduling information or the uplink scheduling information. For example, if the base station configures information that the terminal should receive downlink data in a transmission format "B" in a period "C" in a radio resource "A" via a radio resource control (RRC) signal in advance, the terminal can receive the data transmitted from the base station using the values "A", "B" and "C" although the downlink scheduling information is not received. Similarly, even when the terminal transmits the data to the base station, the data can be transmitted using the predetermined radio resource without receiving the uplink scheduling information according to the above-described information.

In the present embodiment, if a radio resource is allocated like the persistent scheduling method, a method for transmitting a data block which requires more radio resources than the configured radio resource is provided.

Figure 20:
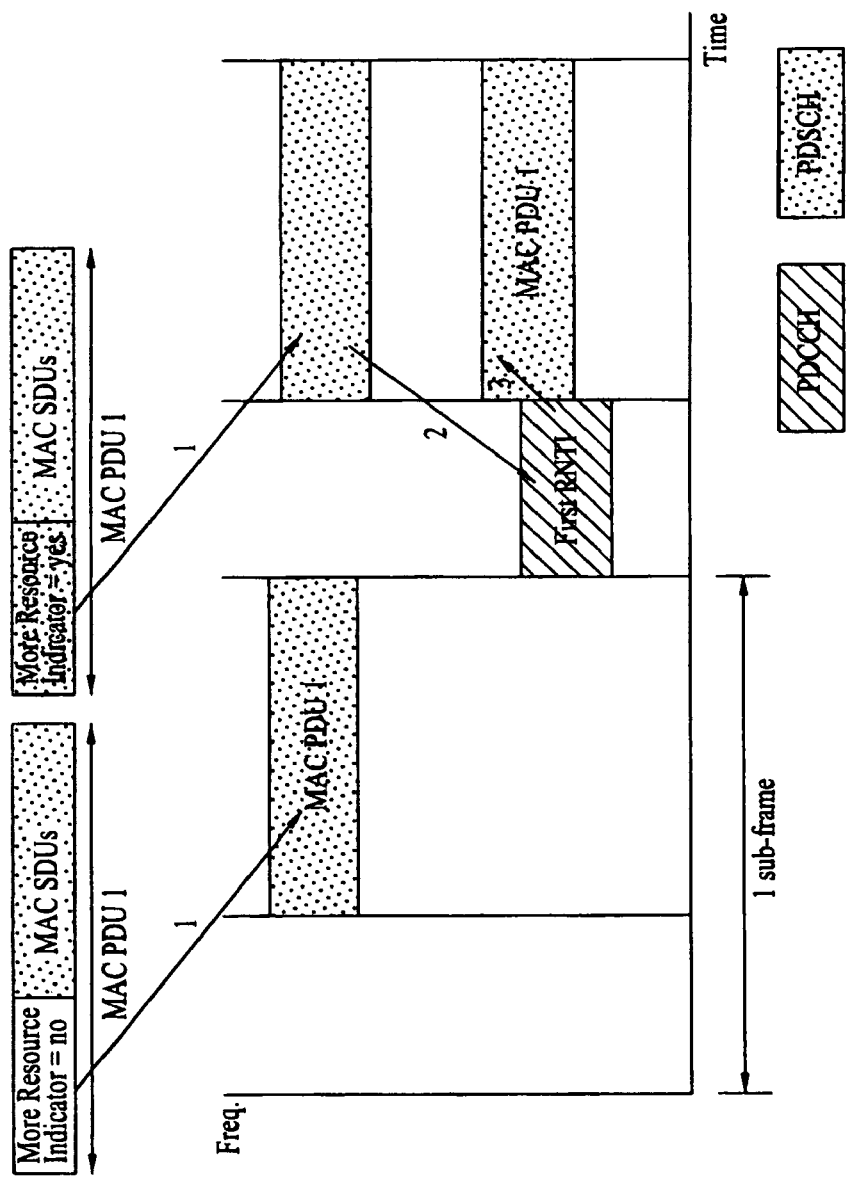
FIG. 20 illustrates a method for using more radio resource in a persistent scheduling method according to an embodiment of the present invention.

FIG. 20 illustrates a method for using more radio resource in a persistent scheduling method according to an embodiment of the present invention.

According to the present embodiment, if the persistent scheduling method is applied, the more resource indicator may be transmitted in a state of being included in the data, in order to use the more radio resource which is allocated for data which will be additionally transmitted.

For example, if the more resource indicator included in the received data is Negative, the data is received via only the radio resource allocated according to the persistent scheduling method. If the more resource indicator included in the received data is Positive, the data can be received via the more radio resource as well as the radio resource allocated according to the persistent scheduling method.

At this time, the scheduling information of the more radio resource may be configured on the system in advance. If the more resource indicator included in the received data is Positive, the scheduling information may be transmitted in a state of being included in the data. If the more resource indicator is Positive as shown in FIG. 20, for example, the PDCCH may be checked via the terminal-dedicated identifier C-RNTI and the scheduling information may be acquired.

In the present specification, the embodiments of the present invention were described concentrating on a data transmission/reception relationship between the base station and the terminal. The base station signifies a terminal node of the network for directly communicating with the terminal. In the present specification, specific operations of the base station described herein may be performed by an upper node of the base station, if necessary. That is, it is apparent that, in a network composed of a plurality of network nodes including the base station, various operations which are performed for communication with the terminal may be performed by the base station or other network nodes excluding the base station.

The term "base station" described herein may be replaced with terms "fixed stations", "node-B", "eNode-B (eNB)", and "access point". In addition, the term "terminal" may be replaced with terms "user equipment (UE)", "mobile station (MS)", and "mobile subscriber station (MSS)".

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

Embodiments disclosed in the present specification are applicable to a variety of mobile communication systems such as an evolved universal mobile telecommunications system (E-UMTS) evolved from a UMTS or a long term evolution (LTE) system.

What is claimed is:

1. A method for receiving data in a mobile communication system, the method comprising:
   receiving a subframe;
   identifying a first control information including a more resource indicator in the subframe using a first identifier;
   acquiring a first data from a first radio resource indicated by the first control information;
   determining whether the more resource indicator is positive;
   identifying a second control information in the subframe using a second identifier when the more resource indicator is positive; and
   acquiring a second data from a second radio resource indicated by the second control information, wherein each of the first identifier is a group specific identifier and the second identifier is a terminal specific identifier.

2. The method according to claim 1, wherein the first data is compressed packet data and the second data is full packet data.

3. The method according to claim 1, wherein each of the first data and the second data is part of a single packet data block.

4. A method for receiving data in a mobile communication system, the method comprising:
   receiving a subframe;

identifying a first control information in the subframe using a first identifier;

acquiring a first data including a more resource indicator from a first radio resource indicated by the first control information;

determining whether the more resource indicator is positive; and acquiring a second data from a second radio resource indicated by the first data when the more resource indicator is positive, wherein each of the first identifier is a group specific identifier and the second identifier is a terminal specific identifier.

5. The method according to claim 4, wherein the first data includes scheduling information of the second radio resource.

6. The method according to claim 4, wherein the first data is compressed packet data and the second data is full packet data.

7. The method according to claim 4, wherein each of the first data and the second data is part of a single packet data block.

8. A method for transmitting data in a mobile communication system, the method comprising:

configuring first control information including scheduling information of a first radio resource and a more resource indicator related to a second radio resource, using a first identifier; and transmitting a subframe including the first control information, wherein the subframe includes a second control information including scheduling information of the second radio resource using a second identifier when the more resource indicator is positive, wherein each of the first identifier is a group specific identifier and the second identifier is a terminal specific identifier.

9. The method according to claim 8, wherein the second control information is included in the subframe.

* * * * *